Dec. 14, 1926.
D. D. EVINS
1,610,271
TEMPERATURE DETECTOR
Filed August 25, 1924
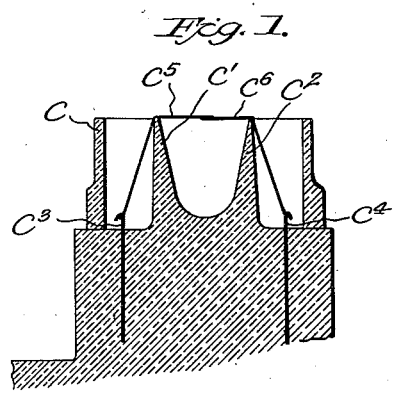
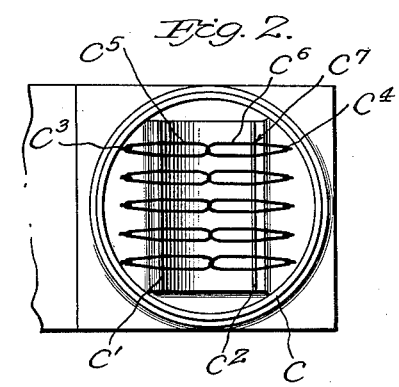
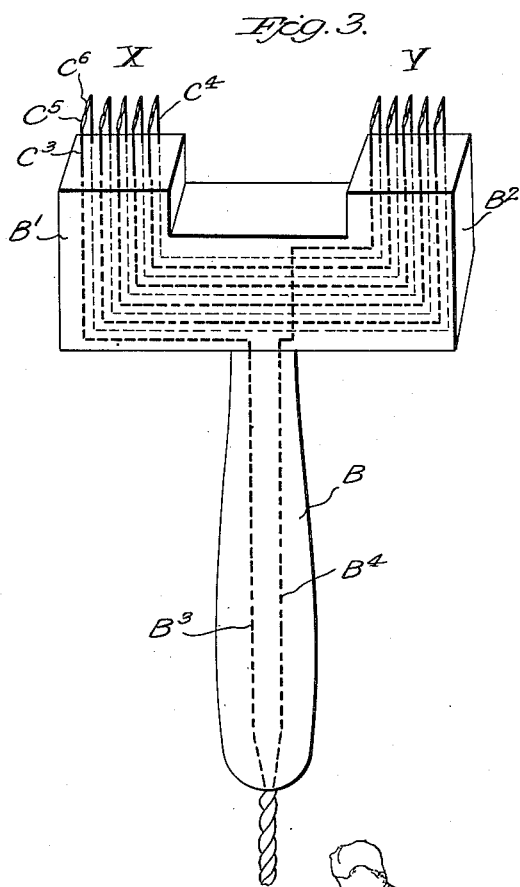
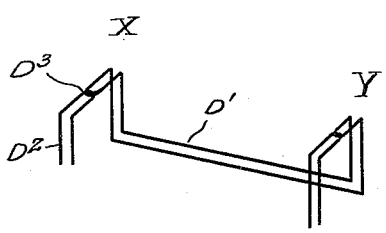
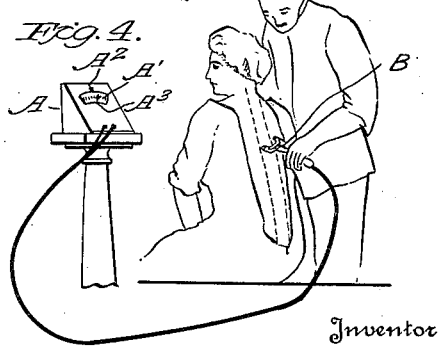
Inventor
Dossa D. Evins
By Parker & Carter
Attorney Patented Dec. 14, 1926.

1,610,271

UNITED STATES PATENT OFFICE.

DOSSA D. EVINS, OF DAVENPORT, IOWA, ASSIGNOR OF ONE-HALF TO FRANK W. ELLIOTT, OF DAVENPORT, IOWA.

TEMPERATURE DETECTOR.

Application filed August 25, 1924. Serial No. 733,871.

My invention relates to an instrument for the rapid and accurate determination of surface temperatures. It has for one purpose the provision of efficient means for rapidly determining surface temperatures in general, and surface temperatures of the human body in particular. In order to provide an instrument which shall be particularly quick and efficient in its action, I have developed a device having the following properties:

The element in contact with the surface of the body is a good heat conductor, and quickly absorbs the temperature of the body, owing not only to the particular metals used, but to the small volume of the element in relation to its exposed surface. For the same reason it has a very small heat capacity, and almost immediately loses the heat it absorbs from the body when removed from the body;

The element is supported in such manner that it can be pressed into intimate contact with the surface of the body, without mechanical damage to the element, and when so pressed against the surface of the body it naturally sinks into or indents the skin, and over half the exposed surface of the element is actually contacted by the surface of the body;

The supporting means upon which the active conducting element is carried is a nonconductor of heat, and, therefore, it does not remove from the highly sensitive element any appreciable quantity of heat while it is being heated, and it does not impart to it any appreciable quantity of heat after the element has been removed from contact with the body and is being cooled;

The dimensions of the supporting means at the point of contact with the sensitive element are kept at a minimum in order to reduce conduction of heat to or from the sensitive element.

My instrument, having the properties above enumerated, is adapted to the taking of a large series of temperature observations in rapid succession, since the sensitive element almost instantly takes the temperature to which it is exposed, and, when withdrawn from the surface being observed, almost instantly returns to the atmospheric temperature.

I illustrate my invention more or less diagrammatically in the accompanying drawings wherein:

Figure 1 is a cross section through the junction of a sensitive thermocouple mounted on its support;

Figure 2 is a plan view showing the form of the sensitive element in detail;

Figure 3 is a diagrammatic perspective of a contacting element consisting of a group of sensitive thermocouples, the junctions of which are exposed;

Figure 4 is a perspective view showing the instrument of Figure 3 in use; and

Figure 5 is a diagrammatic illustration of the wiring connection between thermocouple loops.

Like parts are indicated by like descriptive symbols throughout the specification and drawings.

In Figure 4 I have illustrated in diagrammatic perspective a typical application of my device. A is any indicating means, preferably a sensitive galvanometer, which is provided with a graduated dial $A^1$, associated with which is a fixed indicating arrow $A^2$ and an arrow $A^3$ adapted to move in response to the current passing through the galvanometer.

B is the contacting instrument, wherein is mounted a thermocouple or a thermopile. It is well known that when a junction of two dissimilar metals, such as copper and constantan, to name but one combination, is connected to a galvanometer, variations in temperature at the point of connection of the two metals will cause deflections of the galvanometer needle. This is due to the fact that the electric flow from the junction of the dissimilar metals varies in response to changes in temperature of the junction point.

Owing to the small amounts of current generated by a single thermocouple, and the necessity of using a very highly sensitive galvanometer with a single thermocouple, I prefer to employ a plurality of thermocouples connected in series, whereby the effect of a single thermocouple is multiplied by the number in series. This device is commonly known as a thermopile. For the sake of brevity, the groups of junctions at each end of the termopile, for example X Y of Figure 3, will be referred to simply as junctions.

In the form of device illustrated in Figure 3, B is any suitable hand piece from which may project the arms B¹, B², although it will be realized that this form of hand piece is purely illustrative in nature and that any other suitable form might be used. B³ is an inleading copper wire and B⁴ another copper wire, which serve to connect the thermopile with the galvanometer or with any other suitable current indicating device. It will be understood that the thermopile as a whole consists of an alternation of two different metals, such as copper and constantan, or any other metals suitable as thermocouples. The exposed junctions, X Y, which are spaced apart upon the contacting element or hand piece B are preferably surrounded by protecting rims C which may be of any suitable form or dimensions, the outer edge of such rims lying preferably substantially in the plane of the junctions, as shown in Figure 3. Whereas I prefer to have the junctions lie in substantially the plane of the outer edge of the rims, nevertheless, under some circumstances and for some service, the junctions may be positioned above or below such plane and I do not wish my claims to be limited rigidly to such location of the junctions.

The rims serve not only to protect the sensitive and delicate junctions and to permit their being pressed into contact with the surface of the body, but they also insulate the point under observation by providing a dead air space about it.

Mounted within the protecting rims and terminating substantially in the plane of its outer edge are the bridges C¹, C² outwardly projecting from the contacting element, and formed of an insulating material adapted to insulate the junction both electrically and thermally. I may employ for this purpose wood or fiber or hard rubber or any other suitable substance having the necessary insulating properties.

Adjacent the outer side of the base of each bridge are positioned the wires of the thermopile, which at that point penetrate through the surface of the hand-piece. I may use separate terminal posts or hooks, or I may simply bring through the ends of the wires of the thermopile. To the hooks or posts or wire ends, C³, C⁴, in my preferred form, I solder or otherwise permanently secure fine wire loops, C⁵, C⁶ preferably of substantially finer gauge than the wire or terminal to which they are secured. Each loop is looped through the opposing loop, the loops being soldered or otherwise fastened together at their contact points, to make a perfect electric connection. These loops extend up over the bridges in a species of truss formation. The tensional or spaced relation of the bridges and loops strengthens the entire junction assembly and keeps the wires separated, rendering them self-alining, and prevents possible short-circuiting between adjacent couples, in the event that the wires are stretched or lengthened by long use.

The loops, and the individual wires of each loop, are laterally spaced or spread, for example by being held in the slight notches C⁷ along the upper edges of the bridges C¹ and C², or may be otherwise spaced apart thereon, it being important that the individual wires of each loop be laterally separated.

Whereas in the preferred form above described I employ fine wire loops secured to the ends of heavier gauge wires or of separate terminals, obviously I might employ a fine gauge wire and loop it back and forth between the exposed junctions, thus using the same wire to form the thermopile or thermocouple as a whole, thus avoiding the necessity of the use of separate wires for the exposed loops. This form is indicated in Figure 5, D¹, D² being continuous wires, looped between the junctions X and Y, and contacting as at D³.

It will be realized that while I have shown a highly practical thermocouple or thermopile junction that nevertheless I do not wish to limit myself specifically to the exact elements and arrangements herein described and shown, since changes could be made in the construction and relation of parts without departing from the spirit of my invention.

The use and operation of my invention are as follows:

It is well known that in general inflammations and abnormal conditions of the body cause local variations in temperature. I provide an instrument one practical use of which is the detection of foci of inflammation or other abnormal conditions by the detection and location of the heated points on the body caused thereby. The fever of a wound, or even of a small scratch, if it becomes infected, is easily detected by contact, the excess temperature set up being perceptible to the finger tips. Subcutaneous infections in general, or in many cases, give rise to similar local variations of temperature which are, of course, far harder to detect, being in general imperceptible to the touch. My instrument has for one object to permit the ready detection of such points on the body as have had their tempearture raised even very slightly by local inflammation or other abnormal conditions, my instrument being sensitive to differences in temperature of a minute fraction of a degree.

Whereas I may employ but a single exposed junction and may determine the temperature of the points observed in degrees, I prefer to employ a differential temperature detector, in which the relative temperature of different points upon the body is observed.

In employing my instrument I preferably use a hand piece or a contacting element in which a thermopile is enclosed, two junctions, or sets of junctions, of the thermopile being exposed upon the hand piece and being adapted to be placed in contact with or very closely adjacent to the surface of the body at two spaced points. The same result may be obtained by the use of a single thermocouple but a thermopile is more practical and requires a less sensitive galvanometer. When I employ but a single exposed junction or group of junctions, the opposite junction must be kept at constant temperature.

Because the junction, and the elements thereof in actual contact with the body must be good heat conductors, in order to be able quickly to absorb the heat of the body temperature, and quickly to lose it, when withdrawn from the body, I use the fine wire loops earlier described, in which the volume of the metal is small in relation to the exposed surface.

The bridge, which may be integral with, and in any case is preferably firmly mounted upon the hand piece, provides proper support so that the loops can be pressed into intimate contact with the body without being broken or damaged. Since the loops are looped through each other, they do not depend merely on solder to maintain their contact, although they are soldered together to make a perfect electric circuit. The loops, or the wires of each loop, are spaced apart on the bridge to provide a maximum surface of contact in relation to the mass of metal of the loop. The spacing also has the effect of permitting free circulation of air about the loop, providing for maximum speed in cooling the loop to atmospheric temperature after the junction is withdrawn from the body.

I claim:

1. In a detector, a thermopile having an exposed junction comprising in part opposed loops of diverse metals looped through each other, and transverse supporting bridges for said loops.

2. In a detector, a thermopile having an exposed junction comprising in part opposed loops of diverse metals looped through each other, and transverse supporting bridges for said loops, the wires of each loop being laterally spaced upon said bridges.

3. In a heat detector, a hand piece, a thermocouple mounted upon said hand piece and having exposed junctions, said junctions comprising in part opposed loops of diverse metals looped through each other, and transverse supporting bridges for said loops, adapted to support said loops out of contact with the surface of said hand piece.

4. In a heat detector, a hand piece, a thermocouple mounted upon said hand piece and having exposed junctions, said junctions comprising in part opposed loops of diverse metals looped through each other, and transverse supporting bridges for said loops, adapted to support said loops out of contact with the surface of said hand piece, the wires of each loop being laterally spaced upon said bridges.

5. In a heat detector, a hand piece, a thermocouple mounted therein and having exposed junctions, said junctions comprising in part loops of diverse metals looped through each other, and transverse supporting bridges for said loops, the gauge of the wire of the loops being substantially finer than the gauge of the wire of the rest of the thermocouple.

6. In a heat detector, a hand piece, a thermocouple mounted therein and having exposed junctions, said junctions comprising in part loops of diverse metals looped through each other, and transverse supporting bridges for said loops, the gauge of the wire of the loops being substantially finer than the gauge of the wire of the rest of the thermocouple, and supporting elements for said loops adapted to support said loops out of contact with the surface of said hand piece.

7. In a detector, a thermopile having an exposed junction comprising in part opposed loops of diverse metals looped through each other, and supporting means for said loops.

8. In a heat detector, a thermocouple, a junction therefor comprising alternate wires of diverse metals, fine wire loops of substantially finer gauge than said wires, secured to the wire ends, each loop being of the same metal as the wire to which it is secured, the opposed loops being permanently secured to each other at their points of contact, and sharp edged supporting bridges adapted to support each loop intermediate its ends in position spaced away from the surface of the hand piece, the wires of each loop being spaced laterally apart upon said bridges, said bridges being composed of material resistant to the transmission of heat and electricity.

9. In a heat detector, a hand piece, a thermocouple upon said hand piece having an exposed junction comprising in part opposed loops of diverse metals, said loops being looped through each other and permanently secured at their point of contact.

10. In a temperature detector, a hand piece, a thermocouple upon said hand piece, having an exposed junction, a protecting rim surrounding said junction, the upper edge of the rim and junction lying in substantially the same plane.

11. In a temperature detector, a hand piece, a thermopile upon said hand piece, having a plurality of exposed junctions, said junctions comprising in part a plurality of wires of diverse metals, and supporting members for said wires, upwardly projecting from the hand piece, the wires being laterally spaced along said members.

12. In a temperature detector, a hand piece, a thermopile upon said hand piece, having a plurality of exposed junctions, said junctions comprising in part a plurality of wires of diverse metals, and supporting members for said wires, upwardly projecting from the hand piece, the wires being laterally spaced along said members, and a protecting rim surrounding said junctions, said junctions lying in substantially the plane of the upper edge of the rim.

13. In a temperature detector, a hand piece, a thermopile mounted upon said hand piece and having a plurality of exposed junctions, said junctions comprising in part the terminals of the thermopile wires, loops of fine wire permanently secured to each such terminal, each such loop being connected to an opposed loop of a diverse metal, supporting means for said loops comprising a plurality of spaced bridges, the fine wires of said loops being laterally spaced along said bridges.

14. In a temperature detector, a hand piece, a thermopile mounted upon said hand piece, said thermopile comprising in part opposed wire loops, each loop being secured to an opposed loop of diverse metal, and transverse supporting members for said loops, adapted to space said loops above the underlying surface of the hand piece.

15. In a temperature detector, a hand piece, a thermopile mounted upon said hand piece, said thermopile comprising in part opposed wire loops, each loop being secured to an opposed loop of diverse metal, and transverse supporting members for said loops, adapted to space said loops above the underlying surface of the hand piece, such supporting members being electrically and thermally non-conducting.

16. In a contactor for an indicating apparatus of the class described, a hand piece, a forked extension thereupon and a thermocouple junction located at each tine of said forked extension.

17. In a contactor for an indicating apparatus of the class described, a hand piece, a thermopile mounted within said hand piece, the junctions of said thermopile being exposed at points spaced apart upon the hand piece.

18. In a contactor for an indicating apparatus of the class described, a hand piece, a thermopile mounted within said hand piece, the junctions of said thermopile being exposed at points spaced apart upon the hand piece, and protecting rims surrounding each such junction, each junction lying in substantially the plane of the outer edge of the surrounding rim.

19. In a contactor for an indicating apparatus of the class described, a hand piece, a thermopile mounted within said hand piece, the junctions of said thermopile being exposed at points spaced apart upon the hand piece, and protecting rims surrounding each such junction, each junction lying in substantially the plane of the outer edge of the surrounding rim, said rims lying in generally the same plane.

20. In a contactor for an indicating apparatus of the class described, a hand piece, a cup carried thereby, a thermocouple junction positioned within the cup, the cup being adapted, when pressed against the body of the patient, to form a body of confined air within the cup.

21. In a contactor for an indicating apparatus of the class described, a hand piece, a cup on said hand piece, a thermocouple mounted in said cup including opposed loops of diverse metals secured to each other, supporting means for said loops, upon said hand piece, said loops and supporting means being located substantially in the plane of the edge of said cup.

22. In a contactor for an indicating apparatus of the class described, a hand piece, a cup carried thereby, a thermocouple junction positioned within the cup and means for supporting it in the plane of the rim of the cup.

23. In a contactor for an indicating apparatus of the class described, a hand piece, a plurality of cups carried thereby, a thermocouple junction positioned within each cup, the cups being adapted, when pressed against the body of the patient, to form bodies of confined air about the thermocouple junctions.

24. In a contactor for an indicating apparatus of the class described, a hand piece, a plurality of electric heat sensitive members spaced apart thereon and lying in substantially the same plane.

Signed at Davenport, county of Scott and State of Iowa, this 9th day of August, 1924

DOSSA D. EVINS.